United States Patent [19]

Florence et al.

[11] Patent Number: 4,734,875
[45] Date of Patent: Mar. 29, 1988

[54] LOG MIXER CIRCUIT

[75] Inventors: Judit K. Florence, Menlo Park; Roy W. Latham, Newark, both of Calif.

[73] Assignee: The Singer Company, Binghampton, N.Y.

[21] Appl. No.: 690,213

[22] Filed: Jan. 9, 1985

[51] Int. Cl.$^4$ .............................................. G06F 7/38
[52] U.S. Cl. .................................................... 364/715
[58] Field of Search .................... 364/736, 768, 715

[56] References Cited

U.S. PATENT DOCUMENTS

| | | | |
|---|---|---|---|
| 3,278,730 | 10/1966 | Searcy et al. | 364/752 |
| 4,290,111 | 9/1981 | Dillon | 364/768 |
| 4,531,124 | 7/1985 | Lassallette et al. | 364/768 |

OTHER PUBLICATIONS

Mitchell, Jr., "Computer Multiplication & Division Using Binary Logarithms", *IRE Trans. on Electronic Computers*, Aug. '62, pp. 512-517.

*Primary Examiner*—David H. Malzahn
*Attorney, Agent, or Firm*—Douglas M. Clarkson; Barry L. Haley

[57] ABSTRACT

A logarithmic mixer circuit in the form of a conversion circuit for mixing digital representations of logarithmic values eliminating the usual mathematical processes of determining anti-logs, summing them and then determining the logs again, the invention using addition, subtraction and a look up table. Additional utiity is obtained by the use of scaled offset representations of logarithmic values for digital processing and separate representations for zero values. Also the final output values are limited to the range of the inputs in anticipation of further processing.

3 Claims, 3 Drawing Figures

LOG MIXER CIRCUIT

BACKGROUND OF THE INVENTION

The invention, generally, is a simplified circuit for mixing two logarithms under the control of two numbers. More particularly, a logarithm mixer circuit in accordance with the invention is in a form of conversion circuit for mixing digital representations of logarithm values.

Instead of the usual mathematical process of determining antilogs, summing them, and then, determining the log again, a log mixer circuit that is constructed and arranged according to the principles of the present invention utilizes the much simpler mathematical processes involving adding, subtracting, and using a look-up table.

In the patented prior art, there is a U.S. Pat. No. 4,290,111 to Dillon which is assigned to the same Assignee as the present invention. While that prior patent teaches the determination of a difference value between two signals that represent respective input measurements and uses a logarithmic conversion circuit to provide a signal with a predetermined representative value, the respective component parts are interconnected to achieve results that are completely different from those provided by the circuit of the present invention.

Although the present invention utilizes some of the basic circuit component parts as in the Dillon circuit, the overall arrangement of the present invention, as well as the objectives of the invention, are totally different. These and other distinctions will become more apparent as the description proceeds.

SUMMARY OF THE INVENTION

In accordance with the present invention, very much simpler circuitry is used, which offers distinct advantages over the conventional prior art.

It is a principal object of the invention to provide a new and improved circuit capable of mixing two logarithms that are controlled by two values.

It is also an object of the invention to provide a digital logarithmic mixer circuit that is capable of mixing two logarithmic values that are, respectively, weighted in a predetermined manner.

According to the invention, a digital logarithmic mixer circuit has a first adder circuit with two inputs and a second adder circuit also with two inputs. A subtractor circuit is positioned and is connected to receive as its input the output from the first and second adder circuits.

A look-up table is positioned and connected to receive the output of the subtractor circuit for producing a predetermined output in accordance with the value of the input. Then, a third adder circuit is positioned and connected to receive the output from the look-up table as one of its inputs, the second input being from the output of the first adder circuit. The output from this third adder circuit produces a result that corresponds to the logarithmic mix operation.

The look-up table may take several different forms, but in the present preferred embodiment of the invention, it is a read-only memory circuit.

BRIEF DESCRIPTION OF THE DRAWINGS

Other and further objects, advantages and features of the invention will become more apparent from the following detailed description and claims when considered in connection with the accompanying drawings, in which:

THE PREFERRED EMBODIMENT

Figure 1:
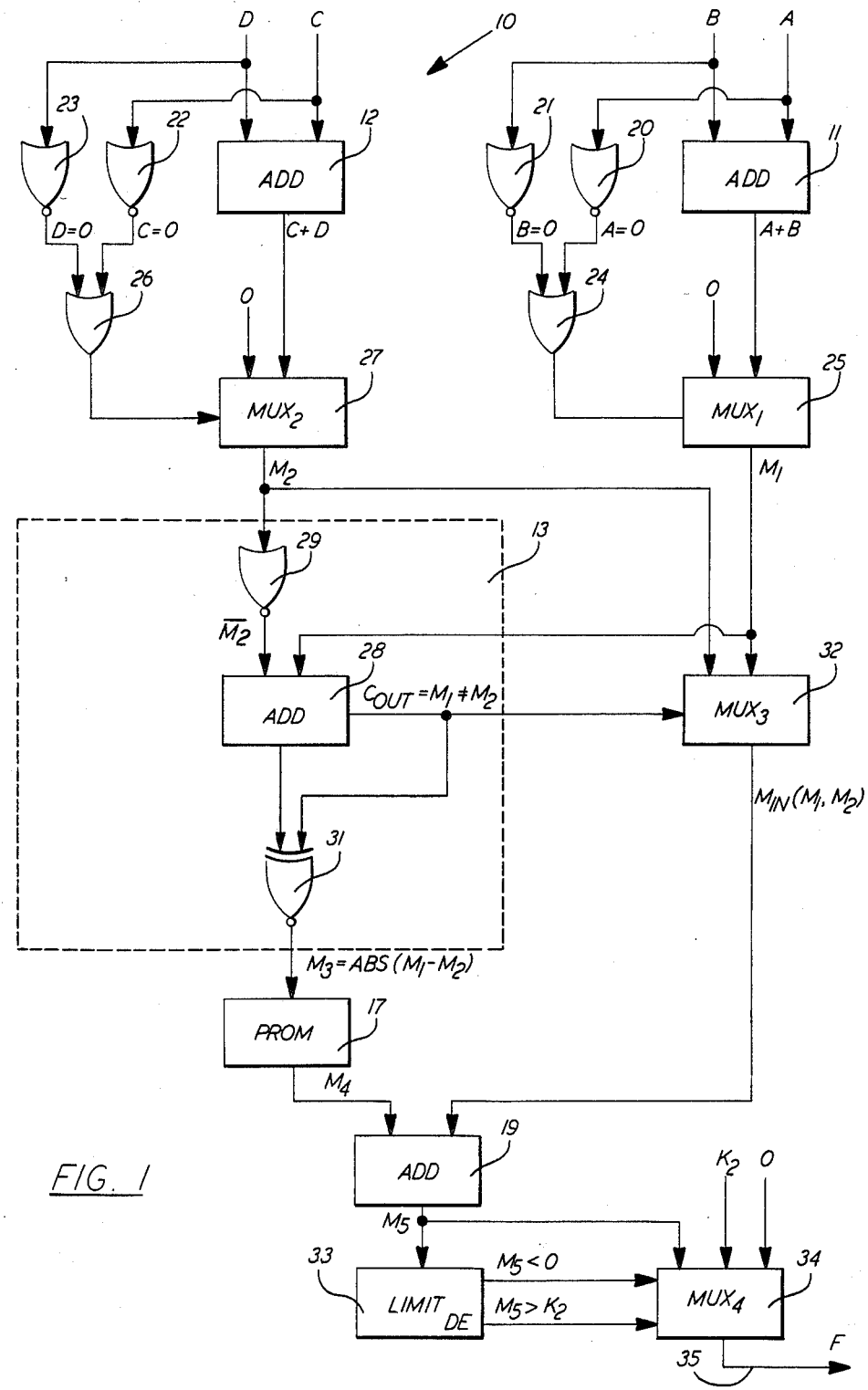
FIG. 1 of the drawings is a block diagram of the log mixer circuit in its presently preferred form.

The invention will be described now in more detail by way of example, with reference to the accompanying drawings, in which FIG. 1 illustrates in block form the logarithmic mixer circuit 10 shown in complete detail. Before proceeding with a description of this somewhat more complex circuit, however, reference is made to the simpler circuit of FIG. 2.

Figure 2:
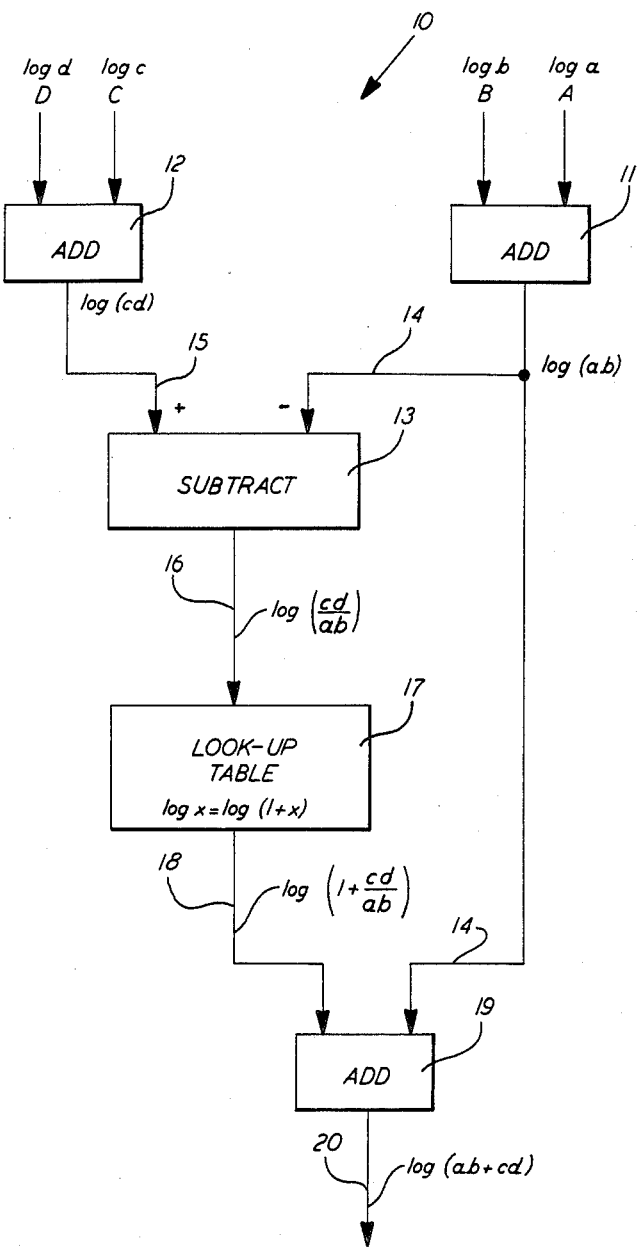
FIG. 2 is a block diagram of the log mixer circuit of the invention in its simplest form, as an aid in describing the invention.

In FIG. 2, the input connections A, B, C, D are digital representations of logarithmic values, so that $A = \log a,$ $B = \log b,$ $C = \log c,$ and $D = \log d.$ A first adder circuit 11 is connected to receive the two input values A and B. The adder circuit 11 forms the sum of A+B which corresponds to the product log ab.

A second adder circuit 12 is connected to receive the two inputs C and D. The adder circuit 12 forms the sum of C+D which corresponds to the product log cd.

A subtractor circuit 13 has two input connections, connection 14 from the output of the adder circuit 11 and connection 15 from the output of the adder circuit 12. The subtractor circuit 13 combines the values log (ab) and log (cd) to produce an output over a connection 16 that is equal to the value log (cd/ab).

A look-up table 17 is arranged to take as an input address any value of "log x" in the range of the digital values output over the connection 16 from the subtractor circuit 13 and to return the value "log (1+x)" as a result of the look-up. By this circuit arrangement, the output value from the subtractor circuit 13 that corresponds to log (cd/ab) is converted to the value log (1+cd/ab).

While the logarithmic conversion circuit 17 may take several different forms, in the presently preferred embodiment of the invention, it is a programmable read-only memory circuit usually known as a PROM.

The output connection 18 from the look-up table 17 is applied as one input connection to a third adder circuit 19, and a second input connection to the third adder circuit 19 is from the output of the adder circuit 11 over a connection 14. The output from the adder circuit 19, therefore, is over a connection 20 and is equal to the value log (ab+cd).

Substantial improvement is obtained by several circuit modifications to the simpler form of circuit of FIG. 2.

To describe the preferred form of the invention now in more detail, reference is made to FIG. 1. For example, to use scaled offset representations of logarithmic values for digital processing, the logarithmic mixer circuit 10 of FIG. 1 is arranged to use:

$$A = K1 \cdot \log(a) + K2$$

rather than just $A = \log(a)$.

In addition, since $\log 0 = -\alpha$, a separate representation for zero values is used. It is suggested that the following representation be used for values smaller than a predefined minimal for x:

$$K1 \cdot \log(x) + K2 = 0$$

whenever x=smaller than the predefined minimal; the logarithmic mixer circuit 10 treats these zero values as special cases, as will be described in more detail presently.

Finally, it is useful to limit the output values back to the range of the input in anticipation of further processing.

In FIG. 1 of the drawings, the same reference numeral identify the same or comparable component parts. In the logarithmic mixer circuit 10 of the present invention, as illustrated in FIG. 1 of the drawings, the four digital inputs are identified with the letters A, B, C, and D which are in a log format, that is:

$$A = K1 \cdot \log(a) + K2$$

$$B = K1 \cdot \log(b) + K2$$

$$C = K1 \cdot \log(c) + K2$$

$$D = K1 \cdot \log(d) + K2$$

The logarithmic mixer circuit 10 of FIG. 1 in accordance with the principles of the present invention, computes a value "F", such that:

$$F = K1 \cdot \log(a \cdot b + c \cdot d) + K2.$$

This function is generated without converting A, B, C, and D to a, b, c, and d respectively and using minimum hardware complexity. The logarithmic mixer circuit 10 shown in FIG. 1 also performs the following limiting functions:

if (A=0) or (B=0) then $F = K1 \cdot \log(c \cdot d) + K2$
if (C=0) or (D=0) then $F = K1 \cdot \log(a \cdot b) + K2$
if ((A=0) or (B=0)) and ((C=0) or (D=0)), then F=0
if (a·b+c·d)>1, then F=K2
if (a·b+c·d)<minimum, then F=0.

In FIG. 1 of the drawings, there are four NOR gates, identified by the numerals 20, 21, 22, and 23, that are connected to function as "zero detect" circuits in order to generate the A=0, B=0, C=0 and D=0 signals.

A logical OR gate, identified by the numeral 24, is connected to receive the outputs from the two NOR gates 20 and 21 to provide the values of A=0 or B=0 as a control to a multiplexer circuit 25. The multiplexer circuit 25 has as one of its inputs the sum of A+B. The other input of the two inputs to the multiplexer circuit 25 is zero, such that when the select line is a logical "one" (for A=0 or B=0), the multiplexer circuit 25 has an output value of M1=0.

Similarly, the logical OR gate 26 provides the functions C=0 or D=0 as a control for a second multiplexer circuit 27. This second multiplexer circuit 27 has the sum C+D and the value "zero" as its two inputs, and the multiplexer circuit 27 has an output of M2 equal to either this sum or a zero.

The subtractor circuit 13 of FIG. 2 is illustrated in FIG. 1 by those component parts within a broken line, identified however by the same reference numeral 13. In FIG. 2, however, the subtractor circuit 13 is illustrated as including basically an adder circuit 28 having two inputs, one from the first multiplexer circuit 25 and one from the second multiplexer circuit 27, identified by the legends M1 and M2.

The output from the multiplexer circuit 27, illustrated by the legend M2, is inverted by an inverter circuit 29 before it is connected to the adder circuit 28. When M1 and M2 are equal in value, all of the bits of the sum M1+M2 are logical "ones".

If the $C_{out}$ is a logical "zero", the output from the adder circuit 28 is inverted to form the output signal, M3, from the subtractor circuit 13. The inversion of the signal is implemented using an EXNOR gate 31:

$$M3 = (C_{out} \cdot \text{sum}) + (\overline{C_{out} \cdot \text{sum}}).$$

The subtractor circuit 13 produces the absolute value of the difference between the values M1 and M2. This can be verified readily by the use of ordinary Boolean algebra and binary arithmetic, well-known to those skilled in the art.

The $C_{out}$ signal from the adder circuit 28 indicates also that M1 is greater than M2, when it is a logical "one". It is used to control a multiplexer circuit 32, such that the circuit 32 selects the value M2 when the select is a logical "one", and the multiplexer circuit 32 selects the signal M1 when the select is a logical "zero". The output of the multiplexer circuit 32, therefore, is indicated as being MIN (M1, M2).

The output of the subtractor circuit 13, in FIG. 1 of the drawings, is indicated as being a signal M3. This signal serves as an address for the conversion circuit 17, which is a PROM in this preferred embodiment. This means that the signal M3 is converted to:

$$M4 = K1 \cdot \log(1 + e^{-M3/K1}) - K2$$

which is stored in the look-up table 17 and is addressed or accessed by the signal M3.

The output of the conversion circuit 17 is indicated, in FIG. 1 of the drawings, as being a signal M4, which is one of the inputs to an adder circuit 19. The other input to the adder circuit 19 is the output from the multiplexer circuit 32.

Finally, the output signal from the adder circuit 19 is indicated as being a signal M5 which is the sum of the signals M4 and MIN (M1, M2).

The signal M5 is connected, as an input, to an upper and lower limit detect circuit 33. This same signal M5 is connected also to a multiplexer circuit 34 as one of its inputs, the other two being the values K2 and "0".

The limit detect circuit 33 provides a control for the multiplexer circuit 34 over one line when the signal M5 is less than "0", and it provides another signal output to the multiplexer circuit 34 when the signal M5 is greater than the value K2. With this control, the multiplexer circuit 34 provides an output over a connection 35 equal to the value F.

Figure 3:
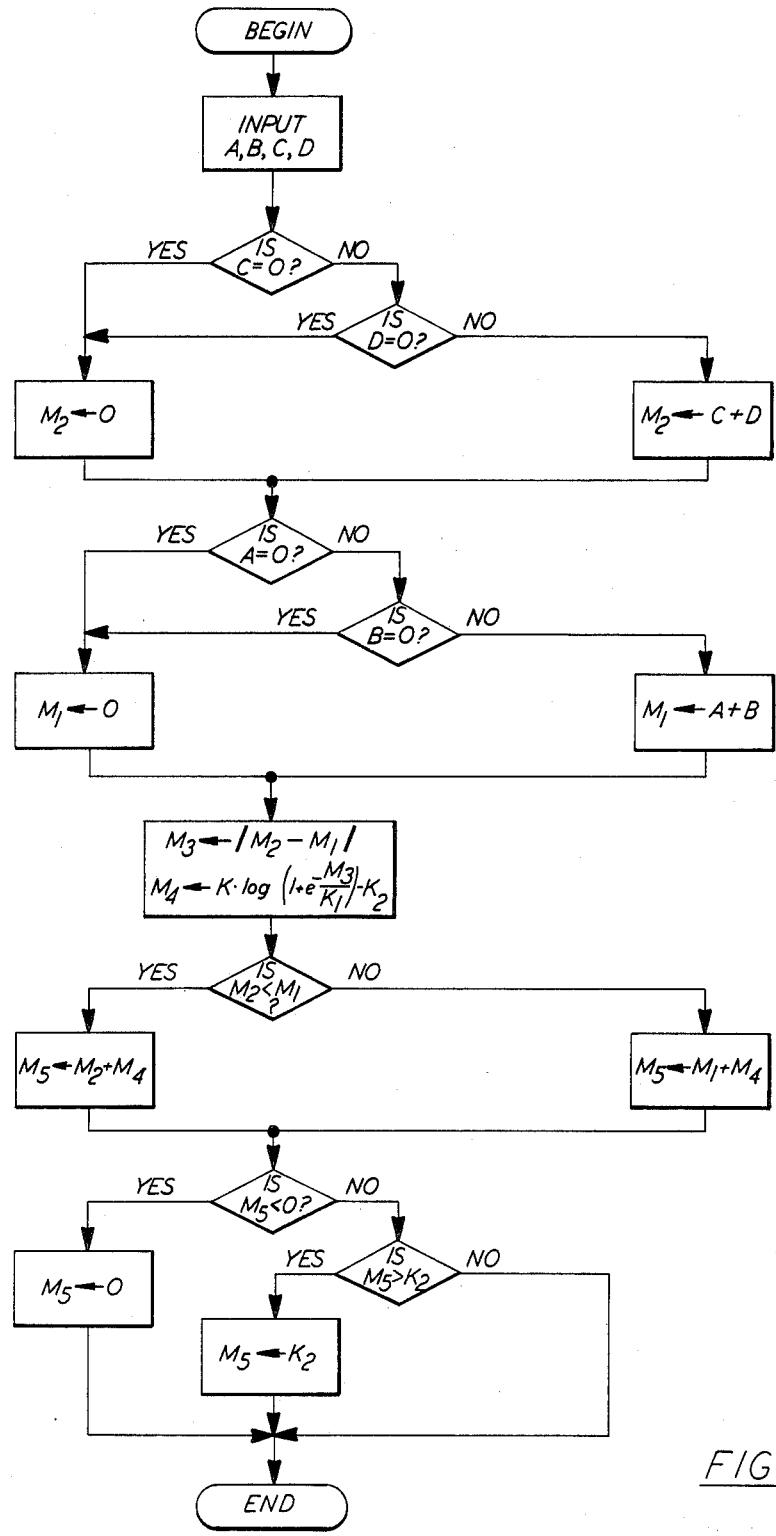
FIG. 3 of the drawings is a flow diagram of the logarithmic mixer circuit of the present invention.

FIG. 3 of the drawings shows in flow chart format the operations of the logarithmic mixer circuit 10, of FIG. 1, of the present invention, wherein block-shaped sections represent procedures and diamond-shaped sections represent tests. The flow chart is designed to be a logically correct representation of the operation of the logarithmic mixer circuit of the present invention. However, equivalent results may be obtained with re-ordered computations and tests, and these may be done for efficient implementation in a particular hardware environment.

Referring now to the flow chart in FIG. 3, it is described more precisely as follows:

```
IF (C = 0) OR (D = 0)     THEN M2 = 0
                          ELSE M2 = C + D
IF (A = 0) OR (B = 0)     THEN M1 = 0
                          ELSE M1 = A + B
M3 = |M2 − M1|
        M4 = K1 · log (1 + e^−M3/K1) − K2
IF (M2 < M1)              THEN M5 = M2 + M4
                          ELSE M5 = M1 + M4
IF (M5 < 0)               THEN M5 = 0
IF (M5 > K2)              THEN M5 = K2.
```

A circuit in accordance with the present invention, clearly can be utilized in a different arrangement. For example, instead of four digital inputs that are substantially of the same nature, the inputs can be two control functions, such as signals B and D that determine the ratio in which the two color components, input signals A and C are to be mixed. An example of this is illustrated by the following:

$A = K1 \cdot \log(a) + K2$ color controlled by B
$C = K1 \cdot \log(c) + K2$ color controlled by D
$B = K1 \cdot \log(b) + K2$ for mixer controls
$D = K1 \cdot \log(d) + K2$ for mixer controls The output, "F", for the logarithmic mixer circuit utilizing two color input signals and two control signals will be as follows:

$F = K1 \cdot \log(a \cdot b + c \cdot d) + K2$

It will be recognized immediately that the above equation has an output of the logarithmic mixer circuit of the present invention is the same for its use with two control signals as it is for the previously described four digital input signals.

The principles of the invention have been described hereinabove in connection with a specific circuit and specific interconnections between component parts. It is to be clearly understood, however, that this description is made only by way of illustration and example and not as limiting the scope of the invention, the scope of the invention being defined by the claims appended hereto.

What is claimed:

1. A digital logarithmic mixer comprising:
   first add circuit means having first and second signal inputs, each of said first and second signal inputs representing a number, said first add circuit means having an output, the output signal representing the sum of said first and second signal inputs;
   second add circuit means having third and fourth signal inputs, each of said third and fourth signal inputs representing a number, said second add circuit means having an output, the output signal representing the sum of said third and fourth signal inputs;
   a subtractor circuit means, having first and second subtractor inputs, said first subtractor circuit means input being the output of said first add circuit means, and the second subtractor circuit means input being the output of said second add circuit means, said subtractor circuit means including a subtractor output;
   look up table means connected to the output of said subtractor circuit means for producing a look up table output; and
   third add circuit means having a first input from the output of the second add circuit means and a second input from the output of the look up table for producing a result corresponding to the logarithmic mix operation.

2. A digital logarithmic mixer is in claim 1, were in the logarithmic mixer circuit computes a value "F" such that:

$F = K1 \cdot \log(a \cdot b + c \cdot d) + K2$ where the first signal input means represents a number $A = K1 \cdot \log(a) + K2$;

said second input signal represents a number $B = K1 \cdot \log(b) + K2$;

wherein said third signal input means represents a number $C = K1 \cdot \log(c) + K2$;

and wherein said fourth signal input represents a number $D = K1 \cdot \log(d) + K2$.

3. A digital logarithmic mixer as in claim 1, including:
   means coupled to said first and second signal inputs to said first add circuit means to determine whether either said first or said second input signal is zero and means for making the output of said first add circuit means equal to zero connected to said means for determining whether or not said first or second input signal is zero whenever said first or second input signal is zero;
   means coupled to said third and fourth signal inputs to said second add circuit means to determine whether either said third or said fourth input signal is zero and means for making the output of said second add circuit means equal to zero connected to said means for determining whether or not said third or fourth signal input is zero, whenever said third or fourth input signal is zero.

* * * * *